(12) United States Patent
Tan et al.

(10) Patent No.: US 11,794,303 B2
(45) Date of Patent: Oct. 24, 2023

(54) SYSTEMS AND METHODS FOR POLISHING COMPONENT SURFACES USING POLISHING TOOL MOUNTED ON MOTORIZED APPARATUS

(71) Applicant: General Electric Company, Schenectady, NY (US)

(72) Inventors: Huan Tan, Clifton Park, NY (US); Yakov Polishchuk, Niskayuna, NY (US); Shaopeng Liu, Clifton Park, NY (US); Li Zhang, Clifton Park, NY (US); Douglas Forman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1204 days.

(21) Appl. No.: 16/242,591

(22) Filed: Jan. 8, 2019

(65) Prior Publication Data
US 2020/0215660 A1    Jul. 9, 2020

(51) Int. Cl.
*B24B 37/04* (2012.01)
*B24B 27/00* (2006.01)
(Continued)

(52) U.S. Cl.
CPC ........ *B24B 37/042* (2013.01); *B24B 27/0076* (2013.01); *B25J 5/007* (2013.01);
(Continued)

(58) Field of Classification Search
CPC ... B24B 19/26; B24B 19/265; B24B 27/0015; B24B 27/003; B24B 27/0038;
(Continued)

(56) References Cited

U.S. PATENT DOCUMENTS 7,346,428 B1   3/2008  Huffman et al.
8,187,055 B2   5/2012  Takahashi et al.
(Continued)

FOREIGN PATENT DOCUMENTS

AU    2015347444 B2 * 12/2019   ............... G06F 1/26
CN    101712151 A     5/2010
(Continued)

OTHER PUBLICATIONS

Oetomo, Denny et al., (2002). Integration of Torque Controlled Arm with Velocity Controlled Base for Mobile Manipulation: An Application to Aircraft Canopy Polishing. Citeseerx, 1-10.
(Continued)

*Primary Examiner* — Joel D Crandall
*Assistant Examiner* — Robert F Neibaur
(74) *Attorney, Agent, or Firm* — Armstrong Teasdale LLP (57) ABSTRACT

A system for polishing a surface of a component includes a motorized apparatus including a body, a drive system coupled to the body, and an arm including a proximal end coupled to the body and a distal end opposite the proximal end. The motorized apparatus further includes a tool coupled to the distal end of the arm. The tool is configured to polish the surface of the component. The motorized apparatus also includes an actuator coupled to the arm. The system also includes a controller configured to position the tool relative to the component by positioning at least one of the body and the arm relative to the component to reach the target area on the component while maintaining a distance between the tool and the body that is less than a threshold distance. The threshold distance is less than a full reach of the arm and is determined to prevent vibrations of the tool and the arm from exceeding a predefined level.

19 Claims, 5 Drawing Sheets

(51) Int. Cl.
 B25J 5/00 (2006.01)
 B25J 19/02 (2006.01)
 B25J 15/00 (2006.01)
 B25J 9/16 (2006.01)
 G05B 19/00 (2006.01)
(52) U.S. Cl.
 CPC ............. *B25J 9/16* (2013.01); *B25J 15/0019* (2013.01); *B25J 19/022* (2013.01); *B25J 19/023* (2013.01); *B25J 19/026* (2013.01); *G05B 19/00* (2013.01)
(58) Field of Classification Search
 CPC ............ B24B 27/0046; B24B 27/0076; B24B 37/042; B25J 5/007; B25J 9/16; B25J 11/065; B25J 15/00; B25J 19/022; B25J 19/023; B25J 19/026; G05B 19/00
 USPC ................................ 700/253; 451/41; 901/41
 See application file for complete search history.

(56) References Cited

U.S. PATENT DOCUMENTS

| | | | | |
|---|---|---|---|---|
| 10,807,238 B2* | 10/2020 | Yasuda | ....................... | B25J 5/02 |
| 11,613,019 B2* | 3/2023 | Nielsen-Cole | ......... | B33Y 50/02 |
| | | | | 414/744.5 |
| 2010/0256812 A1* | 10/2010 | Tsusaka | .................... | A47L 9/24 |
| | | | | 700/254 |
| 2015/0273696 A1* | 10/2015 | Nam | ...................... | B25J 19/023 |
| | | | | 901/44 |
| 2015/0375390 A1 | 12/2015 | Becroft et al. | | |
| 2016/0059416 A1* | 3/2016 | Tian | ....................... | B25J 19/023 |
| | | | | 701/19 |
| 2020/0353511 A1* | 11/2020 | Larsson | ................. | B08B 13/00 |

FOREIGN PATENT DOCUMENTS

| | | |
|---|---|---|
| CN | 104989082 B | 11/2017 |
| CN | 107583812 A | 1/2018 |
| CN | 108544375 A | 9/2018 |
| EP | 2353801 A3 | 9/2015 |

OTHER PUBLICATIONS

Jamisola, Rodrigo et al., (2002). The Operational Space Formulation Implementation to Aircraft Canopy Polishing Using a Mobile Manipulator. Proceedings of the 2002 IEEE International Conference on Robotics & Automation Washington, DC. 400-405.

* cited by examiner

SYSTEMS AND METHODS FOR POLISHING COMPONENT SURFACES USING POLISHING TOOL MOUNTED ON MOTORIZED APPARATUS

BACKGROUND

The field of the disclosure relates generally to polishing a surface of a component, more particularly to a system including a polishing tool mounted on a motorized apparatus.

At least some known systems for treating surfaces of a component include a tool or brush that is manually operated to polish surfaces of the component and provide a desired surface characteristic. However, operation of the systems and the resulting surface characteristics of one or more components may vary based on the operator polishing the surface. Accordingly, at least some known polishing systems are at least partially automated and include a robotic system. However, at least some known robotic systems have difficulty accessing locations on the component. Moreover, sometimes movement and/or extension of the robotic systems results in vibrations transmitted to the tool, which may affect the polishing result. Moreover, at least some known robotic systems require installation at one or more locations adjacent the component to treat surfaces of the component. In addition, at least some known robotic systems require calibration and programming each time the robotic system is installed at a new location. As a result, the time required to polish the component is increased by the time required for the installation, calibration, and programming of the robotic systems.

BRIEF DESCRIPTION

In one aspect, a system for polishing a surface of a component is provided. The system includes a motorized apparatus including a body and a drive system coupled to the body. The drive system is configured to move the body relative to the component. The drive system includes a motor. The motorized apparatus also includes an arm including a proximal end coupled to the body and a distal end opposite the proximal end. At least a portion of the arm is configured to move relative to the body. The motorized apparatus further includes a tool coupled to the distal end of the arm. The tool is configured to polish the surface of the component. The motorized apparatus also includes an actuator coupled to the arm and configured to position the arm relative to the component such that the tool reaches a target area on the component. The system also includes a controller communicatively coupled to the motorized apparatus. The controller is configured to position the tool relative to the component by positioning at least one of the body and the arm relative to the component to reach the target area on the component while maintaining a distance between the tool and the body that is less than a threshold distance. The threshold distance is less than a full reach of the arm and is determined to prevent vibrations of the tool and the arm from exceeding a predefined level. The controller is further configured to control operation of the tool to polish the surface of the component.

In another aspect, a method for polishing a surface of a component is provided. The method includes positioning a motorized apparatus relative to the component. The motorized apparatus includes a body, an arm coupled to the body, and a polishing tool coupled to an end of the arm. The method also includes determining a threshold distance between the polishing tool and the body. The threshold distance is determined such that vibrations of the arm are prevented from exceeding a predefined level during operation of the polishing tool. The method further includes positioning the polishing tool relative to the component to reach a target area of the surface of the component while maintaining a distance between the polishing tool and the body that is less than the threshold distance. The method also includes operating the polishing tool to polish at least the target area of the surface of the component.

In yet another aspect, a motorized apparatus for polishing a surface of a component is provided. The motorized apparatus includes a body and a drive system coupled to the body. The drive system is configured to move the body relative to the component. The motorized apparatus also includes an arm including a proximal end coupled to the body and a distal end opposite the proximal end. At least a portion of the arm is configured to move relative to the body. The motorized apparatus also includes a tool coupled to the distal end of the arm. The tool is configured to polish the surface of the component. The motorized apparatus further includes an actuator coupled to the arm and configured to position the at least a portion of the arm relative to the body such that the tool reaches a target area on the component. The drive system and the actuator are communicatively coupled to a controller and configured to position the tool relative to the component to reach a target area of the surface of the component while maintaining a distance between the polishing tool and the body that is less than a threshold distance.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the terms "polish" and "polishing" refer to treatment of a surface to alter a characteristic of the surface. Treatment of the surface may include, for example and without limitation, polishing, buffing, cleaning, dusting, shining, burnishing, waxing, grinding, and honing. In addition, treatment of the surface may include applying materials, for example and without limitation, coatings, corrosion protectants, lubricants, and paints.

As used herein, the term "arm" refers to a member having a proximal end coupled to a body and a distal end spaced from the body. The arm may include linkages connected by any number of joints and may be positionable about any number of axes. The arm may include, for example and without limitation, manipulator members, telescoping members, pneumatic members, extension members, linear manipulators, articulated torque members, and torque tool members.

Embodiments described herein provide a system and method for polishing a component. The polishing system includes a motorized apparatus and a controller. The motorized apparatus includes a body, an arm, a drive system, and a tool. The motorized apparatus is configured to move relative to the component. A proximal end of the arm is coupled to the body and at least a portion of the arm is configured to move relative to the body. The tool is coupled to a distal end of the arm opposite the proximal end. Accordingly, the polishing system is able to adjust the orientation and location of the tool relative to the component to polish different areas and surfaces of the component. In some embodiments, a controller controls the operation of the polishing system and determines a scope and desired path for polishing the surfaces of the component. As a result, the polishing systems and methods described herein reduce the time required to polish surfaces of the components.

Figure 1:
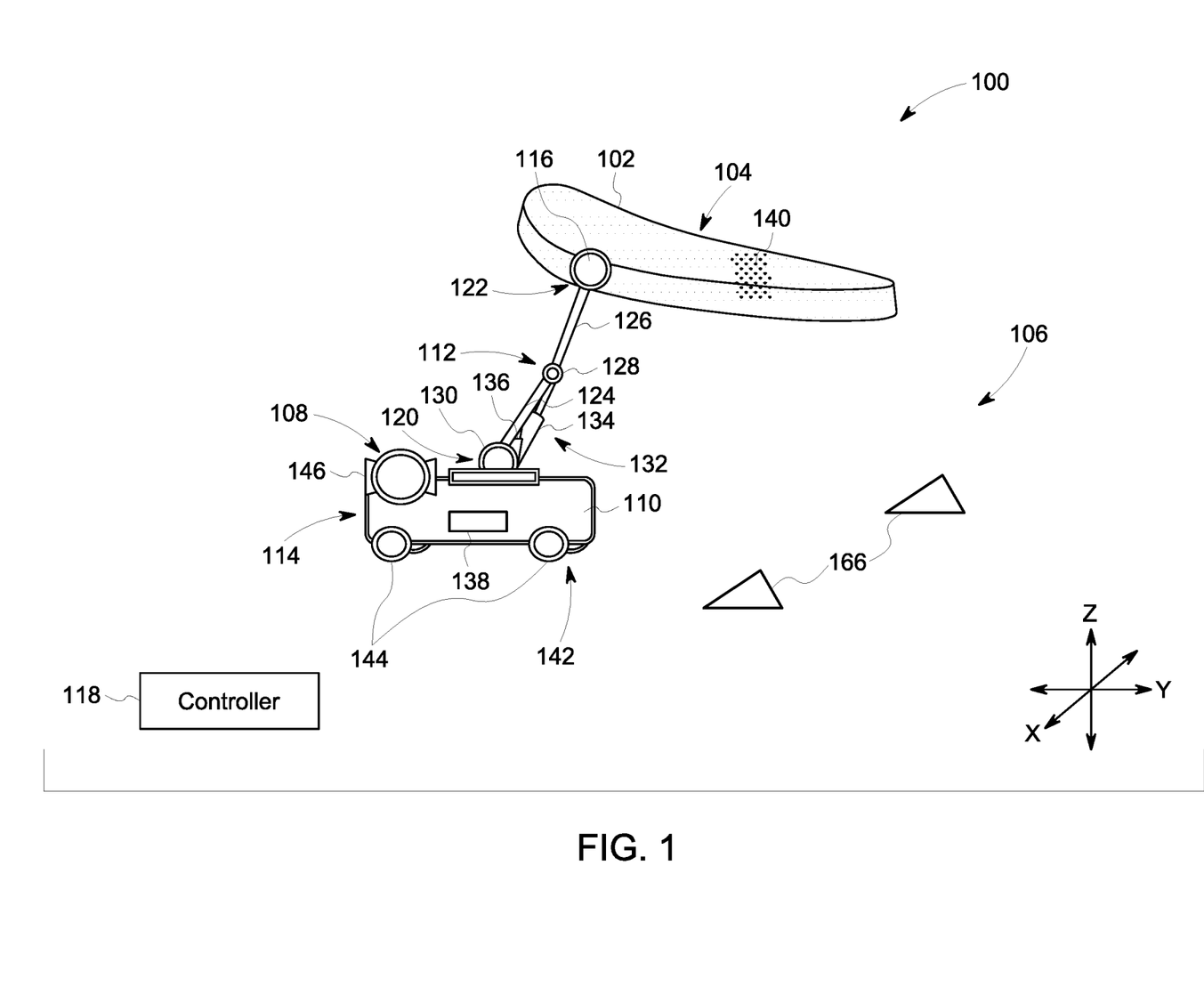
FIG. 1 is a perspective view of an exemplary system including a motorized apparatus for polishing a surface of a component.

FIG. 1 is a perspective view of an exemplary system 100 for polishing surfaces 102 of a component 104 within an environment 106. System 100 includes a motorized apparatus 108 including a body 110, an arm 112, a drive system 114, a tool 116, and a controller 118. Motorized apparatus 108 is configured to move relative to component 104 and polish surfaces 102 of component 104. In alternative embodiments, motorized apparatus 108 includes any components that enable system 100 to operate as described herein.

In the exemplary embodiment, arm 112 includes a proximal end 120 coupled to body 110 and a distal end 122 opposite proximal end 120. Tool 116 is coupled to distal end 122 and is configured to treat surface 102 of component 104. For example, in some embodiments, tool 116 contacts surface 102 and abrades or otherwise changes a characteristic of surface 102 such as a roughness/smoothness. In further embodiments, tool 116 applies a material such as a wax to surface 102. In some embodiments, tool 116 includes, for example and without limitation, a polishing buffer, a sander, a polishing pad, and/or a brush. In alternative embodiments, motorized apparatus 108 includes any tool 116 that enables system 100 to operate as described herein.

Also, in the exemplary embodiment, arm 112 includes a proximal portion 124, a distal portion 126, a first joint 128, and a second joint 130. First joint 128 is located between distal portion 126 and proximal portion 124. Proximal portion 124 extends from proximal end 120 to joint 128. Distal portion 126 extends from joint 128 to distal end 122. Joint 128 is configured to allow distal portion 126 to move relative to proximal portion 124 and body 110. Second joint 130 couples proximal end 120 to body 110 such that proximal portion 124 is positionable relative to body 110. For example, in some embodiments, joints 128, 130 include, without limitation, a hinge, a pin connection, a ball-and-socket, a cam, and/or a bearing assembly. In alternative embodiments, arm 112 includes any joint 128, 130 and/or portion 124, 126 that enables arm 112 to function as described herein. For example, in some embodiments, arm 112 includes three or more joints 128. In further embodiments, at least one of joints 128, 130 is omitted.

In addition, in the exemplary embodiment, an actuator assembly 132 is configured to move at least a portion of arm 112 relative to body 110 such that arm 112 is positionable relative to body 110 and component 104. For example, proximal portion 124 and/or distal portion 126 of arm 112 are positionable in at least one of an X-direction, a Y-direction, and a Z-direction in reference to the orientation shown in FIG. 1. Specifically, actuator assembly 132 includes a first actuator 134 coupled to distal portion 126 and configured to move distal portion 126 about joint 128 and relative to proximal portion 124. Actuator assembly 132 also includes a second actuator 136 coupled to proximal portion 124 and configured to move proximal portion 124 about joint 130 and relative to body 110. Accordingly, arm 112 is articulated and has a plurality of degrees of movement relative to body 110. In alternative embodiments, arm 112 is actuated using any mechanism that enables arm 112 to operate as described herein. For example, in some embodiments, actuator assembly 132 includes, for example and without limitation, servo motors, linear actuators, solenoid actuators, pneumatic actuators, and/or hydraulic actuators. In addition, in the exemplary embodiment, a power source, such as a battery 138, provides power for operation of arm 112.

Moreover, in the exemplary embodiment, drive system 114 is coupled to body 110 and is configured to move body 110 through environment 106 and relative to component 104 and obstructions 166. Accordingly, drive system 114 enables body 110 to move to areas adjacent targets of interest 140 on surface 102 of component 104. Drive system 114 includes a drive mechanism 142, such as wheels 144, and one or more motors 146 drivingly coupled to drive mechanism 142. A power source, such as battery 138, provides power for operation of motor 146. During operation of motorized apparatus 108, motor 146 is able to induce rotation of wheels 144 to propel body 110 along a surface. Motorized apparatus 108 moves along any surface as wheels 144 rotate in contact with the surface. Accordingly, drive system 114 moves body 110 in the X-Y plane. In the exemplary embodiment, drive system 114 is a differential drive system and is capable of rotating each wheel 144 at a speed different from the rotational speed of the other wheels. In alternative embodiments, motorized apparatus 108 includes any drive system 114 that enables motorized apparatus 108 to operate as described. For example, in some embodiments, drive system 114 includes a drive mechanism other than wheels 144, such as treads, tracks, worms, legs, and/or electromagnetic or fluidic locomotion mechanisms. In further embodiments, motorized apparatus 108 includes any drive system 114 that enables motorized apparatus 108 to operate as described herein. For example, in some embodiments, motorized apparatus 108 includes, for example and without limitation, fans, thrusters, electrostatic adhesion devices, suction devices, and/or vacuum adhesion devices.

Also, in the exemplary embodiment, tool 116 is positioned relative to component 104 to polish surface 102 by moving motorized apparatus 108 using drive system 114 and/or positioning at least a portion of arm 112 relative to body 110. Accordingly, tool 116 is positioned by motorized apparatus 108 and/or arm 112 around, under, and/or above component 104. In some embodiments, tool 116 may be positioned by simultaneous movement of body 110 relative to component 104 and arm 112 relative to body 110. In some embodiments, motorized apparatus 108 is anchored in position relative to component 104 while tool 116 is polishing surface 102. In alternative embodiments, tool 116 is positioned relative to component 104 in any manner that enables system 100 to operate as described herein.

In addition, in the exemplary embodiment, targets of interest 140 are identified by a human user and/or controller 118. Targets of interest 140 include areas of surface 102 for treatment by system 100. In the exemplary embodiment, controller 118 is configured to automatically track and record locations of targets of interest 140. In addition, controller 118 identifies obstructions 166 or other objects. Accordingly, controller is able to determine a route around component 104 and address any targets of interest 140. Targets of interest 140 and/or obstructions 166 may be stored in controller 118 and/or identified by controller 118 in real time as controller 118 moves about component 104.

Figure 2:
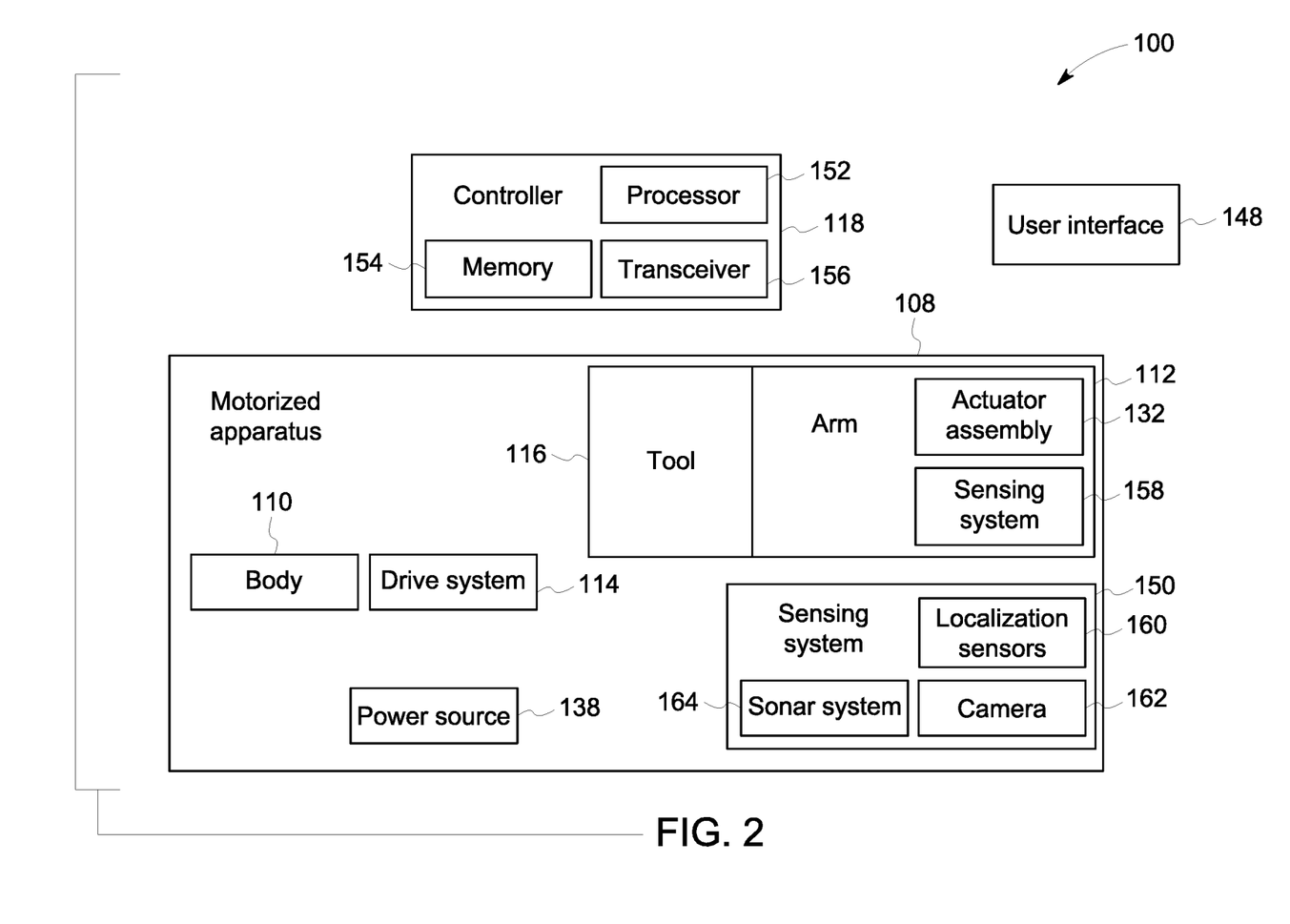
FIG. 2 is a schematic diagram of the system shown in FIG. 1.

FIG. 2 is a schematic diagram of system 100. System 100 includes motorized apparatus 108, controller 118 and a user interface 148. Motorized apparatus 108 includes body 110, arm 112, drive system 114, and tool 116. In the exemplary embodiment, motorized apparatus 108 further includes power source 138 and a sensing system 150. In some embodiments, at least a portion of controller 118 is incorporated into motorized apparatus 108. Controller 118 includes a processor 152, a memory 154, and a transceiver 156. Arm 112 includes actuator assembly 132 and a sensing system 158. In alternative embodiments, at least a portion of sensing system 158 is incorporated with sensing system 150. In alternative embodiments, system 100 includes any components that enable system 100 to operate as described herein. For example, in some embodiments, system 100 includes any number of motorized apparatus 108, any number of tools 116, and/or any number of arms 112.

In the exemplary embodiment, sensing system 150 includes localization sensors 160, a camera 162, and a sound navigation and ranging (sonar) system 164. In the exemplary embodiments, localization sensors 160 include, for example and without limitation, a light detection and ranging (Lidar) device, an inertial measurement unit (IMU), and/or an encoder. Sensing system 158 includes, for example and without limitation, an encoder, and/or an inertial measurement unit (IMU). Sensing system 158 provides the position of arm 112 for controller 118. Sonar system 164 is configured to transmit signals to controller 118 and controller 118 transmits signals to motor 146, such that motor 146 will adjust speed and direction of motorized apparatus 108 to avoid obstructions 166. In some embodiments, at least a portion of controller 118 is incorporated into sonar system 164 and/or motor 146. In alternative embodiments, system 100 includes any sensors that enable system 100 to operate as described herein. For example, in some embodiments, sensing systems 150 and 158 include, for example and without limitation, a position sensor, a Lidar device, an IMU, a camera, a sonar device, an infrared camera, eddy current sensors, and/or any other suitable sensor.

Also, in the exemplary embodiment, controller 118 is configured to receive signals from sensing system 150 and/or sensing system 158 and determine a position of motorized apparatus 108 and/or arm 112 based on the signals. During operation of motorized apparatus 108, controller 118 continuously tracks the position of motorized apparatus 108 and arm 112 in environment 106, including position of body 110 relative to component 104 and position of arm 112 relative to component 104 and/or body 110. In some embodiments, controller 118 is configured to receive signals from camera 162. For example, camera 162 captures images and controller 118 is configured to process captured images to identify locations of targets of interest 140. In some embodiments, a model of environment 106 is created based on signals from sensing system 150 and/or sensing system 158, and controller 118 uses and modifies the model in real time to operate motorized apparatus 108. In further embodiments, at least a portion of the model of environment 106 is provided to controller 118 prior to operation of motorized apparatus 108.

In addition, in the exemplary embodiment, controller 118 is configured to determine a sequence of tasks for motorized apparatus 108. Tasks include, for example and without limitation, positioning of motorized apparatus 108 relative to a component 104 and polishing surface 102 of component 104. In some embodiments, controller 118 determines tasks based on inputs from sensing systems 150 and 158 and/or based on operator input. Controller 118 controls the operation of arm 112, body 110, and/or tool 116 to perform each task. For example, controller 118 determines an array of step-by-step operations for arm 112, body 110, and/or tool 116 to complete a determined task. In some embodiments, controller 118 operates arm 112, body 110, and/or tool 116 based on determined targets of interest 140, desired characteristics of the surface to be treated, duration of operation of tool 116, location of portions of motorized apparatus 108 during operation, estimated energy used by motorized apparatus 108, and/or force and/or torque applied by tool 116 to component 104.

Moreover, in the exemplary embodiment, controller 118 is configured to determine the initial location of motorized apparatus 108, including positions of body 110, arm 112 and tool 116, and locations of targets of interest 140. Controller 118 is configured to operate motorized apparatus 108 to position motorized apparatus 108 adjacent targets of interest 140. For example, in some embodiments, controller 118 is configured to generate a sequence of waypoints that lead from initial location of motorized apparatus 108 to targets of interest 140. Waypoints are geographical X-position, Y-position, and Z-position locational markers created relative to environment 106 and/or relative to component 104. In some embodiments, controller 118 is configured to determine a path for at least one of body 110 and arm 112 to move between individual waypoints. Controller 118 receives signals from sensing systems 150 and 158 and can determine the path based on the received signals. For example, sensing systems 150 and 158 may detect obstructions 166 and controller 118 determines a path around the detected obstructions 166. Controller 118 is configured to control the position, velocity, and acceleration of body 110, arm 112 and/or tool 116 along the determined path to move motorized apparatus 108 between waypoints. Controller 118 is configured to send signals to actuator assembly 132. In some embodiments, controller 118 uses motion planning algorithms to determine paths for body 110 and arm 112. For example, motion planning algorithms include a potential field algorithm and a rapidly-exploring random tree (RRT)-connect algorithm. In further embodiments, controller 118 utilizes, for example and without limitation, RTT and/or path finding algorithms. In alternative embodiments, system 100 uses any algorithms that allow system 100 to operate as described herein.

Also, in the exemplary embodiment, controller 118 is configured to transmit signals to components of motorized apparatus 108 such as drive system 114 to execute operations. In the exemplary embodiment, operations include, for example and without limitation, positioning body 110 about component 104, positioning body 110 within environment 106, moving arm 112 relative to body 110 and relative to component 104, moving tool 116 relative to arm 112 and relative to component 104, and operating tool 116. In the exemplary embodiment, operation of tool 116 includes, for example and without limitation, rotation of tool 116 relative to arm 112 and component 104, translation of tool 116 relative to component 104, reciprocation of tool 116, vibration of tool 116, and generating a pressure on a surface using tool 116. In alternative embodiments, controller 118 operates motorized apparatus 108 in any manner that enables system 100 to operate as described herein.

In some embodiments, controller 118 determines the path of motorized apparatus 108 using a potential field algorithm. For example, a potential field algorithm is used to associate locations of targets of interest 140 with positive attraction values and associate obstructions 166 within environment 106 with negative attraction values. The positive and negative attraction values are used to orientate the direction of motion of motorized apparatus 108 away from negative attraction values and towards positive attraction values. In addition, controller 118 measures the distance and direction between arm 112, body 110, and/or tool 116 and locations targets of interest 140 and/or obstructions 166 in environment 106. Controller 118 uses these distances and directions, along with the associated positive or negative attraction values, to generate the path for motorized apparatus 108. In alternative embodiments, controller 118 determines a path for motorized apparatus 108 in any manner that enables controller 118 to operate as described herein.

In addition, in some embodiments, controller 118 uses RRT-connect algorithms to generate paths for motorized apparatus 108. For example, controller 118 generates at least one potential path trajectory (tree branch) started from the initial starting location of motorized apparatus 108 (root) to the location of targets of interest 140 or waypoints generated by the task planning module. The RRT-connect algorithm is configured to provide a random set of first nodes in environment 106 relative to the initial starting location of motorized apparatus 108. A potential straight line path is generated between the initial starting location and all randomly generated first nodes. Subsequently, second nodes are randomly generated in environment 106 relative to the first nodes and a potential straight line path is connected between each first node and second node. This process continues with additional random node generation and additional potential path connection between adjacent nodes until a path is found which connects the initial starting location with the location of targets of interest 140 or waypoint along a path devoid of obstructions 166.

In some embodiments, controller 118 includes an optimization module and is configured to meet at least one performance parameter while satisfying a first constraint and a second constraint. In the exemplary embodiment, performance parameters include, for example and without limitation, reduced operations times, consistent polishing results, and limited wear of tool 116. In the exemplary embodiment, a first constraint is to reduce the energy usage of motorized apparatus 108 and a second constraint is to maintain the range of motion of tool 116 less than a set threshold. The range of motion of tool 116 is defined as the distance between tool 116 and proximal end 120 along the X-direction, the Y-direction, and the Z-direction (shown in FIG. 1). The maximum boundary range of motion is the furthest distance along a vector from distal end 122 and tool 116 with vector components along any or all of the X-direction, the Y-direction, and the Z-direction that is allowed by the geometric configuration of arm 112. Controller 118 is configured to maintain the range of motion less than a set threshold boundary within the maximum range of motion. The energy required to move motorized apparatus 108 is related to the force/torque on each joint 128, 130. Accordingly, controller 118 is configured to maintain the force/torque on each joint 128, 130 less than a threshold value. In further embodiments, a first constraint is to reduce the energy consumption of the motorized apparatus 108 and a second constraint is to limit the reach of arm to limit vibration of the tool. In alternative embodiments, controller 118 uses any constraints that enable system 100 to operate as described herein. In some embodiments, constraints include, for example and without limitation, speed constraints, acceleration constraints, torque and/or force constraints, and/or acceleration or deceleration constraints.

In the exemplary embodiment, controller 118 controls operation of motorized apparatus 108 by sending signals to and receiving signals from motorized apparatus 108. Specifically, transceiver 156 is communicatively coupled with motorized apparatus 108 and is configured to send information to and receive information from motorized apparatus 108. In the exemplary embodiment, controller 118 communicates wirelessly with motorized apparatus 108. For example, controller 118 is configured to send information to drive system 114 relating to the propulsion and/or steering of body 110 while motorized apparatus 108 is moving within environment 106. Controller 118 is configured to send information to actuator assembly 132 relating to force and motion targets of arm 112. In alternative embodiments, motorized apparatus 108 and controller 118 communicate in any manner that enables motorized apparatus 108 to operate as described herein. For example, in some embodiments, controller 118 and motorized apparatus 108 exchange information through a wired link extending between motorized apparatus 108 and controller 118. In addition, processor 152 is configured to execute task instructions for controlling actuator assembly 132, and/or drive system 114 of body 110. In alternative embodiments, system 100 includes any controller 118 that enables system 100 to operate as described herein. In some embodiments, at least a portion of controller 118 is incorporated into motorized apparatus 108. In further embodiments, transceiver 156, processor 152, and/or memory 154 is omitted.

In addition, in the exemplary embodiment, system 100 includes a user interface 148 that is configured to display information detected by sensing system 150 and 158 for interpretation by a human user. For example, in some embodiments, user interface 148 displays images of a surface finish. User interface 148 is included on a remote computing device and/or incorporated with controller 118. In some embodiments, user interface 148 includes, among other possibilities, a web browser and/or a client application. In some embodiments, user interface 148 allows a user to input and/or view information relating to control of motorized apparatus 108. For example, in some embodiments, a user may steer motorized apparatus 108 around component 104 using user interface 148. In the exemplary embodiment, user interface 148 is further configured to display information relating to the state of a drive system 114, actuator assembly 132, power source 138, and/or a steering component. In some embodiments, processor 152 translates user inputs into steering, motion of tool 116, motion of arm 112, control of camera 162, sensor control, sensor motion, and/or any other commands. Processor 152 can send information via transceiver 156 to motorized apparatus 108 and/or user interface 148 can send and receive information directly with motorized apparatus 108. In some embodiments, user control of motorized apparatus 108 is in real time, such as through a joystick, keyboard, touchscreen or other interface having similar function.

In other embodiments, motorized apparatus 108 is controlled partially or wholly according to a pre-programmed routine. In some embodiments, a user inputs information, such as operation goals or conditional directions, and motorized apparatus 108 is at least partially automated. In further embodiments, controller 118 logs information, such as information received by controller 118 from motorized apparatus 108, control data sent to motorized apparatus 108, and additional user inputs or state information (e.g., location, time, orientation, datalink quality, battery levels, repair material levels, failure mode indicators) into memory 154.

Also, in some embodiments, data such as a model of component 104, model of the environment 106, and/or locations of targets of interest 140 is collected and/or stored by controller 118. For example, in some embodiments, collected data is sent and stored in a cloud based storage system. Moreover, a life-time model will continuously compute and update analytics and modules. The accumulated data is utilized for the development of a machine learning model to improve polishing process accuracy and optimize the polishing process. In alternative embodiments, the data from system is used in any manner that enables system to operate as described herein.

Figure 3:
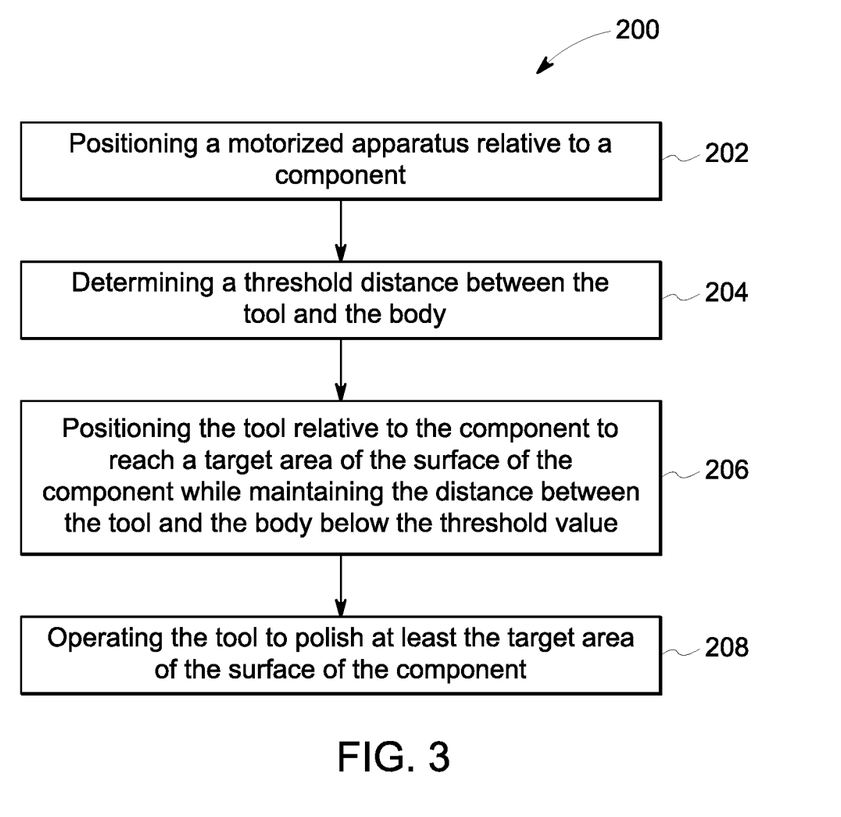
FIG. 3 is a flow diagram of an exemplary method for polishing the surface of a component using the system shown in FIGS. 1 and 2.

FIG. 3 is a flow diagram of an exemplary method 200 for polishing surface 102 of component 104 (shown in FIG. 1). With reference to FIGS. 1-3, method 200 includes positioning 202 motorized apparatus 108 relative to component 104, determining 204 a threshold distance between tool 116 and body 110, positioning 206 tool 116 relative to component 104 to reach target of interest 140, and operating 208 tool 116 to polish surface 102. Positioning 202 motorized apparatus 108 includes positioning body 110, arm 112, and/or tool 116 relative to a component 104. In some embodiments, controller 118 estimates the distance along the X-direction, Y-direction and Z-direction (shown in FIG. 1) between tool 116 and proximal end 120 of arm 112 during a potential movement of tool 116 and compares the distance to the threshold distance. The threshold distance is less than the full reach of arm 112 and may be determined to reduce vibrations at the distal end of arm 112 in comparison to when arm 112 is fully extended. For example, in some embodiments, a ratio of the threshold distance to the full reach of arm 112 is in a range of about 0.25 to about 0.9. The threshold distance can be measured along a straight line between tool 116 and proximal end 120 of arm 112 and can include components along any of the X, Y, and Z-axes.

Controller 118 determines a movement of tool 116 that maintains the distance less than the threshold distance while meeting at least one other constraint such as power consumption. Accordingly, positioning tool 116 relative to component 104 to reach target of interest 140 includes positioning tool 116 relative to component 104 to reach target of interest 140 while maintaining the distance between tool 116 and body 110 less than the threshold value and maintaining power consumption less than a target value.

In some embodiments, controller 118 quantifies the power consumption of motorized apparatus 108. For example, in some embodiments, controller quantifies the power consumption of arm 112 based on the force and/or torque at joints 128, 130. In further embodiments, controller 118 quantifies the power consumption of the drive system 114 as motorized apparatus 108 is moved about component 104. Controller 118 may control operation of motorized apparatus 108 to maintain the power consumption of motorized apparatus 108 less than a threshold value.

Figure 4:
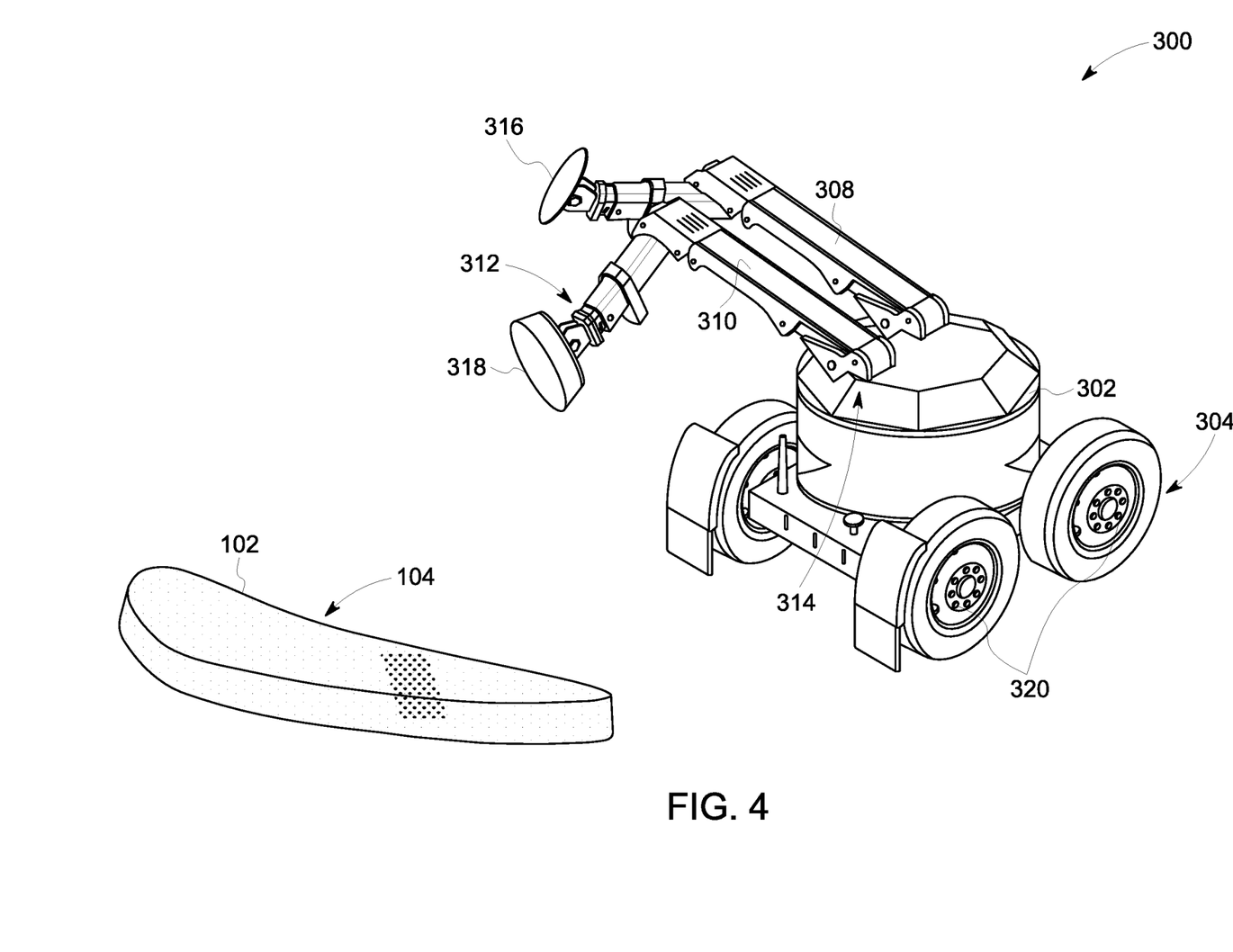
FIG. 4 is a perspective view an exemplary motorized apparatus for use with the system shown in FIG. 2, wherein the motorized apparatus includes a body, and two arms coupled to the body.

FIG. 4 is a perspective view of an alternative exemplary motorized apparatus 300 for use with system 100 (shown in FIGS. 1 and 2). Motorized apparatus 300 includes a body 302, a drive system 304, and a plurality of arms 308, 310. In the exemplary embodiment, motorized apparatus 300 includes a first arm 308 and a second arm 310. Each of first arm 308 and second arm 310 includes a distal end 312 and a proximal end 314. Proximal ends 314 of first arm 308 and second arm 310 are mounted to body 302. In alternative embodiments, motorized apparatus 300 include any number of arms 308, 310.

Also, in the exemplary embodiment, motorized apparatus 300 includes at least one polishing tool 316, 318 mounted to the distal end 312 of either first arm 308 or second arm 310. Each of first arm 308 and second arm 310 is articulated such that first arm 308 and second arm 310 are independently positionable relative to component 104. In the exemplary embodiment, a first tool 316 is mounted to first arm 308 and includes a cloth polishing wheel. A second tool 318 is mounted to second arm 310 and includes a brush. In alternative embodiments, motorized apparatus 300 includes any tool 316, 318 that enables motorized apparatus 300 to operate as described herein. For example, in some embodiments, motorized apparatus 300 includes, without limitation, a brush, a cloth, an applicator, a sander, and/or a grinder.

In addition, in the exemplary embodiment, drive system 304 is coupled to body 302 and is configured to move body 302 within environment 106 relative to component 104 and obstruction 166. Drive system 304 includes wheels 320, and a motor (not shown in FIG. 4) drivingly coupled to the wheels 320. A power source, such as a battery (not shown in FIG. 4), provides power for operation of the motor. During operation of motorized apparatus 300, the motor induces rotation of wheels 320 relative to body 302. Motorized apparatus 300 moves along any surface as wheels 320 rotate in contact with surface. In the exemplary embodiment, drive system 304 is a differential drive system and is capable of rotating each wheel 320 at a speed different from the rotational speed of the other wheels 320. In alternative embodiments, motorized apparatus 300 includes any drive system 304 that enables motorized apparatus 300 to operate as described. For example, in some embodiments, drive system 304 includes a drive mechanism other than wheels 320, such as treads, tracks, worms, legs, and/or electromagnetic for fluidic locomotion mechanisms. In further embodiments, motorized apparatus 300 includes any mechanism that enables motorized apparatus 300 to operate as described herein. For example, in some embodiments, motorized apparatus 300 includes, for example and without limitation, fans, thrusters, electrostatic adhesion devices, suction devices, and/or vacuum adhesion devices. Motorized apparatus 300 is positionable relative to the component 104 to allow tools 316, 318 to polish difficult to access parts of surface 102 of component 104. In alternative embodiments motorized apparatus 108 includes any equipment that allows or causes motion of motorized apparatus 108 about component 104.

In the exemplary embodiment, tools 316, 318 are positioned relative to component 104 by moving motorized apparatus 300 about component 104 and/or positioning first arm 308 and/or second arm 310 relative to component 104. Accordingly, tools 316, 318 are able to be positioned around, under, and/or above component to reach target locations. Moreover, body 302 is moved in the X-Y plane to move first arm 308 and second arm 310 and body 302 about component 104. In alternative embodiments, positioning of tools 316, 318 may include simultaneous positioning of first arm 308, second arm 310, and/or body 302. In alternative embodiments, tools 316, 318 are positioned relative to component 104 in any manner that enables motorized apparatus 300 to operate as described herein.

Figure 5:
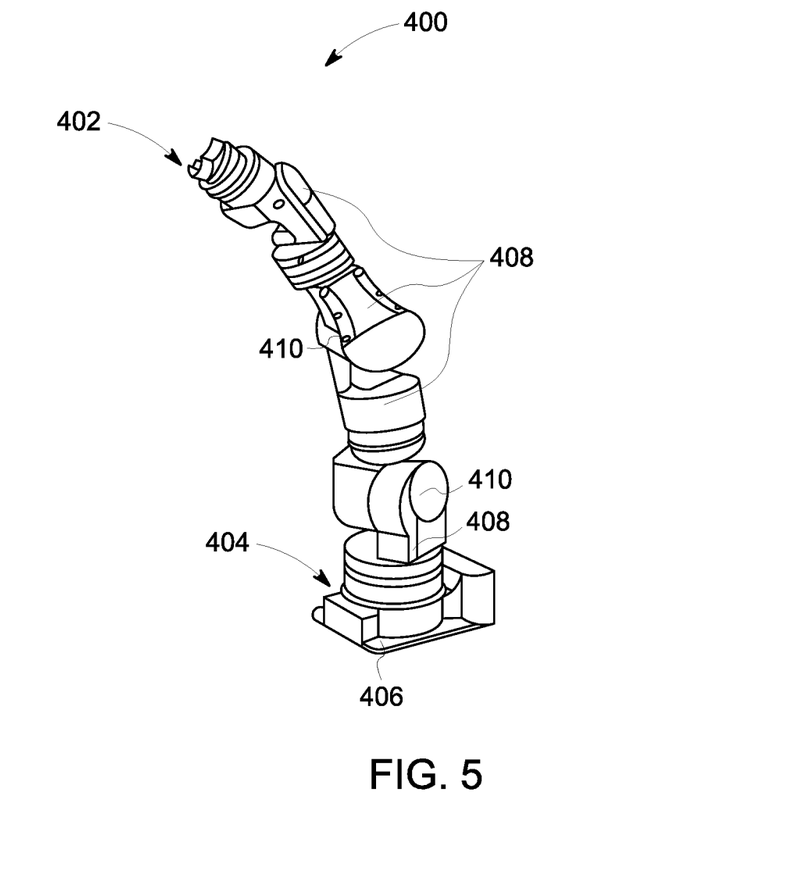
FIG. 5 is a perspective view of an alternative embodiment of an arm for use with the system shown in FIGS. 1 and 2.

FIG. 5 is a perspective view of an alternative embodiment of an arm 400 for use with system 100 (shown in FIGS. 1 and 2). In the exemplary embodiment, arm 400 includes a distal end 402 and a proximal end 404. Proximal end 404 includes a mounting bracket 406 to be coupled to body 110 (shown in FIG. 1) or another suitable apparatus to move arm 400 about component 104 (shown in FIG. 1).

In the exemplary embodiment, tool 116 (shown in FIG. 1) can be coupled to distal end 402. Distal end 402 is positionable to locate tool 116 (shown in FIG. 1) adjacent target areas on component 104. For example, arm 400 is articulated such that distal end 402 is positionable relative to proximal end 404 and mounting bracket 406. In the exemplary embodiment, arm 400 includes a plurality of links 408 connected by a plurality of joints 410. Each joint 410 is coupled between adjacent links 408 and allows the adjacent links 408 to move relative to each other. For example, in some embodiments, joints 410 include hinges, pivots, pins, bearings, and/or any other suitable joints. In some embodiments, arm 400 includes an actuator (not shown in FIG. 5) to control movement of arm 400. In alternative embodiments, arm 400 is positionable in any manner that enables arm 400 to operate as described herein.

An exemplary technical effect of the methods, systems, and apparatus described herein includes at least one of: (a) reducing the time to polish surfaces of components; (b) increasing the accessibility of difficult-to-reach locations on a component; (c) reducing the time that components are out of service for maintenance; (d) providing systems to polish surfaces of an entire component without repositioning the component; (e) increasing the consistency of polishing of components; (f) increasing the precision of surface treatments by reducing vibrations during polishing operations; and (g) reducing energy consumption of polishing systems.

Exemplary embodiments of methods, systems, and apparatus for maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring treatment of surfaces, and are not limited to practice with only the systems and methods as described herein. Rather, the exemplary embodiment can be implemented and utilized in connection with many other applications, equipment, and systems that may benefit from using tool mounted on a motorized apparatus.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for polishing a surface of a component, said system comprising:
   a motorized apparatus comprising:
   a body;
   a drive system coupled to said body and configured to move said body relative to the component, said drive system comprising a motor;
   an arm comprising a proximal end coupled to said body and a distal end opposite said proximal end, wherein at least a portion of said arm is configured to move relative to said body;
   a tool coupled to said distal end of said arm, wherein said tool is configured to polish the surface of the component; and
   an actuator coupled to said arm and configured to position said arm relative to the component such that said tool reaches a target area on the component; and
   a controller communicatively coupled to said motorized apparatus, wherein said controller is configured to:
   determine an estimated power consumption of said motorized apparatus during a polishing operation;
   determine a threshold distance that is less than a full reach of said arm and that prevents vibrations of said tool and said arm from exceeding a predefined level;
   determine a movement of at least one of said body and said arm relative to the component that enables said tool to reach the target area on the component while maintaining i) a distance between said tool and said body that is less than the determined threshold distance, and ii) the estimated power consumption less than a threshold power consumption,
   position at least one of said body and said arm in accordance with the determined movement; and
   control operation of said tool to polish the surface of the component and to maintain the estimated power consumption less than the threshold power consumption during the polishing operation.

2. The system in accordance with claim 1, wherein said drive system comprises a plurality of wheels configured to be driven by said motor to move said body relative to the component.

3. The system in accordance with claim 1, wherein said actuator comprises a servo motor configured to move at least a portion of said arm relative to the component.

4. The system in accordance with claim 1, wherein said arm is articulated and further comprises at least one joint located between said distal end and said proximal end, said joint configured to allow said distal portion to move relative to said proximal portion.

5. The system is accordance with claim 1, wherein said controller is configured to cause said drive system to move said body relative to the component.

6. The system in accordance with claim 1, wherein said controller is configured to cause said actuator to position at least a portion of said arm relative to the component and relative to said body.

7. The system in accordance with claim 1, wherein said controller is configured to position said tool relative to the component by positioning at least one of said body and said arm relative to the component.

8. The system in accordance with claim 1, wherein said motorized apparatus comprises at least one localization sensor, and wherein said controller is configured to receive localization sensor data from said at least one localization sensor and determine the position of said motorized apparatus relative to the component.

9. The system in accordance with claim 8, wherein said controller is configured to determine a distance between said tool and said body based on information from said at least one localization sensor.

10. A method for polishing a surface of a component, said method comprising: positioning a motorized apparatus relative to the component, wherein the motorized apparatus includes a body, an arm coupled to the body, and a polishing tool coupled to an end of the arm; determining an estimated power consumption of the motorized apparatus during a polishing operation; determining a threshold distance between the polishing tool and the body that is less than a full reach of the arm, wherein the threshold distance is determined such that vibrations of the arm are prevented from exceeding a predefined level during operation of the polishing tool; determining a movement of the polishing tool relative to the component that enables the polishing tool to reach a target area of the surface of the component while maintaining i) a distance between the polishing tool and the body that is less than the determined threshold distance and ii) the estimated power consumption less than a threshold power consumption; position the polishing tool relative to the component in accordance with the determined movement; and operating the polishing tool to polish at least the target area of the surface of the component and maintain the estimated power consumption less than the threshold power consumption during the polishing operation.

11. The method in accordance with claim 10, wherein positioning the polishing tool relative to the component comprises at least one of positioning the body and positioning the arm relative to the component.

12. The method in accordance with claim 10, wherein positioning the motorized apparatus relative to the component comprises operating a drive system coupled to the body of the motorized apparatus to propel the motorized apparatus relative to the component along a path determined by a controller.

13. A motorized apparatus for polishing a surface of a component, said motorized apparatus comprising: a body; a drive system coupled to said body and configured to move said body relative to the component; an arm including a proximal end coupled to said body and a distal end opposite said proximal end, wherein at least a portion of said arm is configured to move relative to said body; a tool coupled to said distal end of said arm, wherein said tool is configured to polish the surface of the component; and an actuator coupled to said arm and configured to position said at least a portion of said arm relative to said body such that said tool reaches a target area on the component, wherein said drive system and said actuator are communicatively coupled to a controller, wherein the controller is configured to determine an estimated power consumption of said motorized apparatus during a polishing operation determine a threshold distance that is less than a full reach of said arm and that prevents vibrations of said tool and said arm from exceeding a predefined level, wherein said drive system and said actuator are configured to position said tool relative to the component to reach a target area of the surface of the component while maintaining i) a distance between said tool and said body that is less than the determined threshold distance and ii) the estimated power consumption less than a threshold power consumption.

14. The motorized apparatus in accordance with claim 13, wherein said drive system comprises a motor and a plurality of wheels coupled to said body and configured to move said body.

15. The motorized apparatus in accordance with claim 13, wherein said actuator comprises a servo motor configured to move said at least a portion of said arm relative to the component.

16. The motorized apparatus in accordance with claim 13 wherein said controller is configured to control operation of said drive system and said actuator to position said tool relative to the component.

17. The motorized apparatus in accordance with claim 16 further comprising a sensor system communicatively coupled to said controller and configured to transmit information to said controller relating to a location of the component.

18. The motorized apparatus in accordance with claim 13, wherein said arm is articulated and further comprises at least one joint located between said distal end and said proximal end, said joint configured to allow said distal portion to move relative to said proximal portion.

19. The system in accordance with claim 4, further comprising determining a force on said at least one joint, wherein said controller is configured to determine the estimated power consumption of said motorized apparatus based on the force on said at least one joint.

* * * * *